No. 657,771. Patented Sept. 11, 1900.
F. HENRIOD-SCHWEIZER.
TRANSMISSION DEVICE FOR MOTOR CARS.
(Application filed Apr. 12, 1900.)
(No Model.) 2 Sheets—Sheet 1.
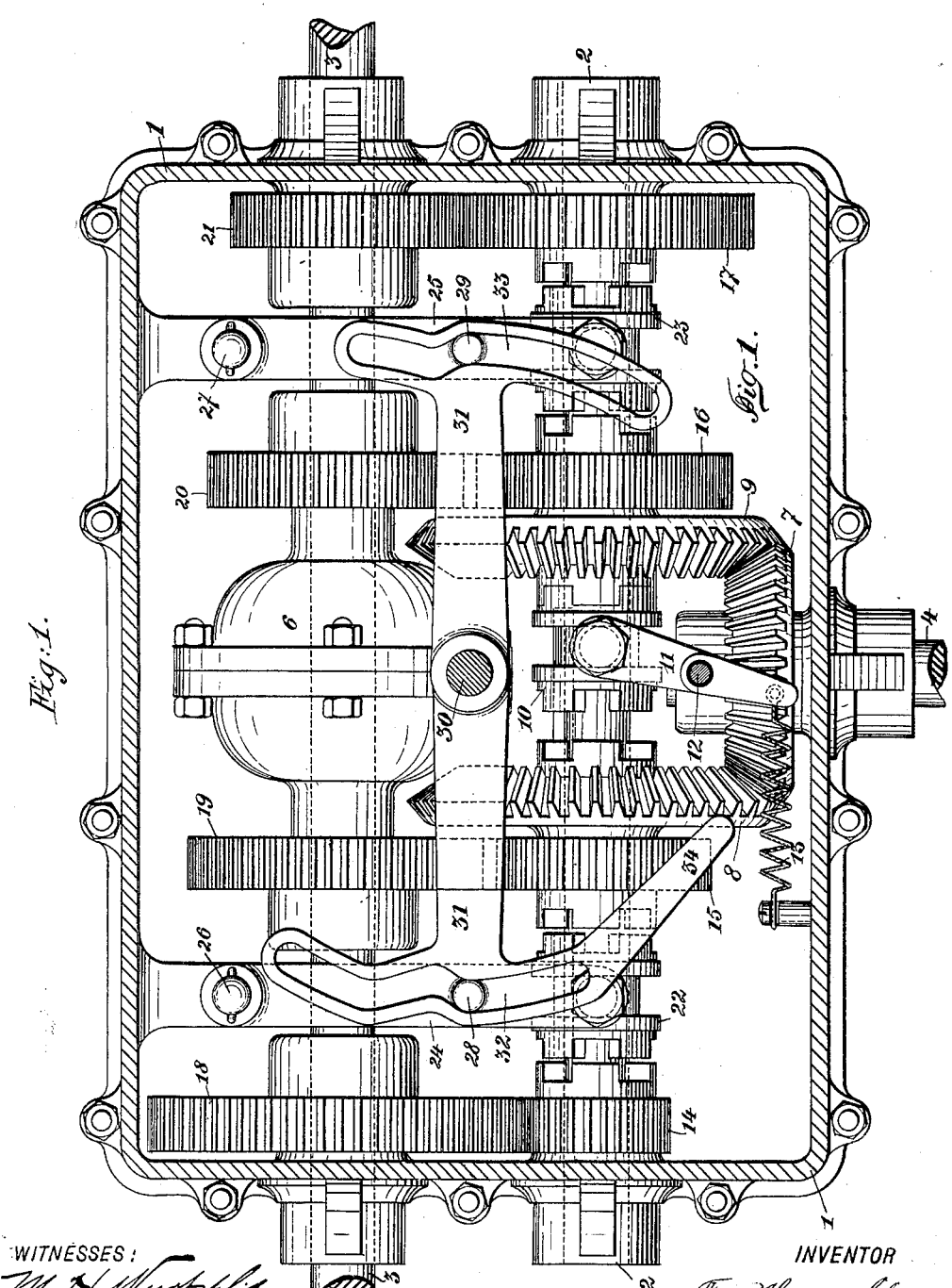

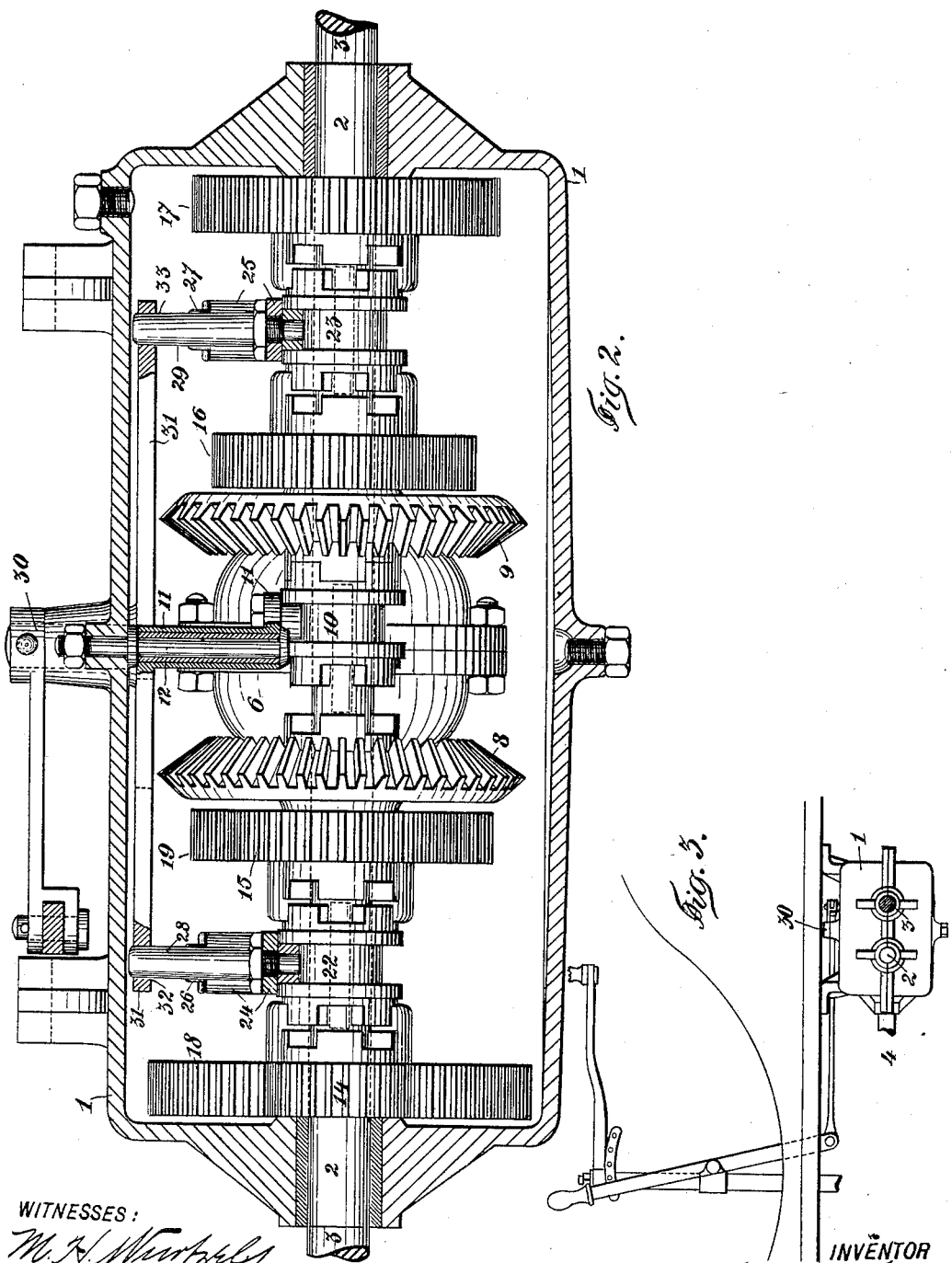

UNITED STATES PATENT OFFICE.

FRITZ HENRIOD-SCHWEIZER, OF MARIN, SWITZERLAND.

TRANSMISSION DEVICE FOR MOTOR-CARS.

SPECIFICATION forming part of Letters Patent No. 657,771, dated September 11, 1900.

Application filed April 12, 1900. Serial No. 12,569. (No model.)

*To all whom it may concern:*

Be it known that I, FRITZ HENRIOD-SCHWEIZER, manufacturer, a citizen of the Republic of Switzerland, residing at Marin, Switzerland, have invented certain new and useful Improvements in Transmission Devices for Motor-Cars, of which the following is a specification.

This invention concerns an improved device or apparatus intended to transmit rotation from any motor whatever to the usual differential gear acting upon the driving-shaft of a motor-car of any construction whatever, the said device being intended to cause the car to move with different speed while the motor-shaft is rotating continuously in one sense, and a device being provided to allow this rotation to be inverted. The whole mechanism is contained within a closed box, which may be partially filled with oil or other lubricating material.

The accompanying drawings show by way of example one form of execution of the invention.

Figure 1 shows a horizontal section, and Fig. 2 a vertical section, of the machine. Fig. 3 is a schematical illustration of the manner in which the usual steering-lever of the car may be connected with the invention.

1 is a perfectly-closed box in which two shafts 2 and 3 are located in parallel position to each other.

4 is the motor-shaft, rotating with constant speed. The broken shaft 3 of the usual differential is intended to bear suitable chain-wheels intended to drive corresponding chain-wheels fixed to the driving-wheels. On the motor-shaft is fixed an angular gear 7, engaging with two conical wheels 8 and 9, loosely placed upon the shaft 2. A double coupling-box 10 is placed on the shaft 2, so as to rotate with the same, but adapted to slide thereon. A coupling-lever 11, fulcrumed at 12 and engaging the coupling-box 10, is retained in its normal position by means of a spring 13, in which position the wheel 9 is in gear. Shaft 2 further carries four loose wheels 14, 15, 16, and 17, which engage in correspondent wheels 18, 19, 20, and 21, respectively, which are keyed on the broken shaft 3 of the differential gear. Two further coupling-boxes 22 and 23 are fixed upon the shaft 2 and connected with same through key and groove, so as to alternately impart rotation through one of the wheels 18, 19, 20, and 21 to shaft 3 with a view of driving the same with different speed. The sliding of the coupling-boxes 22 and 23 and their connection with the gear-wheels 14 15 16 17 is caused by means of a lever 24 or 25, which is fulcrumed at 26 or 27, respectively, and is provided with a vertical projection 28 or 29, respectively. Upon a central vertical shaft 30 there is affixed in the interior of box 1 a rocking lever 31, rocking in horizontal direction and provided at its two extremities with suitable slots 32 and 33, respectively, of peculiar shape, in which engage the projections 28 and 29, respectively, of the levers 24 and 25, respectively. The slots 32 and 33 are of such a shape that the lever 31, being properly rocked by means of the shaft 30, the coupling-boxes 22 and 23 cause the transmission of power through the wheels 18 or 19 or wheels 20 or 21, respectively.

34 is a nose fixed on the extremity of the lever 31 and intended to act upon the lever 11, which acts upon the coupling-box 10, with a view of putting the conical wheel 9 out of operative action and to put the conical wheel 8 in operative action, thus causing the car-wheels to be moved backward. This action of the nose 34 is obtained by the engagement of the projection 28 with that portion of the slot 32 which causes the coupling-box 22 to engage the wheel 14, imparting to the driving-wheels the minimum speed.

By means of a to-and-fro rotation of the vertical shaft 30 one causes the forward and backward movement of the car, as well as the change of the speed of the same.

The box 1 may be supplied with oil or other lubricant, so as to have the rotating parts of the mechanism continuously submerged with oil, and hence carefully lubricated.

Having thus fully described my invention, I claim—

1. In a transmission device for motor-vehicles, the combination of two sets of meshing gears of varying diameters, one set being loose on its shaft, means for rotating the shaft of the loose gears, clutch members, each for coupling one of the loose gears with the shaft on which they are arranged, levers connected with said clutch members, a fulcrumed controlling lever extending transversely of aforesaid levers and suitably connected with aforesaid levers, and means for oscillating said controlling-lever, substantially as set forth.

2. In a transmission device for motor-vehicles, the combination of two sets of meshing gears of varying diameter, one set being loose on its shaft, means for rotating the shaft of the loose gears, clutch members, each for coupling one of the loose gears with the shaft on which they are arranged, levers connected with said clutch members, a fulcrumed controlling-lever, the opposite ends of which are formed with cam-slots receiving suitable projections on aforesaid levers, and means for oscillating said controlling-lever, substantially as set forth.

3. In a transmission device for motor-vehicles, the combination of two sets of meshing gears of varying diameters, one set being loose on its shaft, means for rotating the shaft of the loose gears, slidable clutch members on said shaft, each adapted to couple one of the loose gears with the said shaft, a pair of levers, pivoted at one end and connected at the other end with said clutch members, a fulcrumed controlling-lever, the ends of which are formed with cam-slots receiving suitable projections on aforesaid levers, and means for rocking said controlling-lever, substantially as set forth.

4. In a transmission device for motor-vehicles, the combination of two sets of meshing gears of varying diameters, one set being loose on its shaft, the motor-shaft, gearing connecting the latter with aforesaid shaft, two gears of said connecting-gearing being loose, a shiftable clutch member for connecting either of said two loose gears with their shaft, means for normally maintaining said clutch member in forwarding position, means for connecting any one of the other of said loose gears with their shaft, means for operating the same, and provided with means for throwing the first clutch member from its normal forwarding position into reversing position, substantially as set forth.

5. In a transmission device for motor-vehicles, the combination of two sets of meshing gears of varying diameters, one set being loose on its shaft, and three pairs of said gears being for forward movement and another pair for reversing, means for driving said shaft, a clutch member adapted to connect said driving means with said shaft for either forward or reversed movement, means for normally maintaining said clutch member in forwarding position, means, comprising a pair of levers, for connecting any one of the loose gears with their shaft, a fulcrumed controlling-lever suitably connected with said pair of levers, and provided with a projecting nose for acting on the means for maintaining the first-named clutch member in forwarding position, whereby a reverse movement is caused, and means for oscillating said controlling-lever, substantially as set forth.

6. In a transmission device for motor-cars, the combination, with the motor-shaft, a bevel-gear on said shaft, of a shaft to be driven, a series of gear-wheels on said driven shaft, an intermediate shaft, loose gear-wheels on said intermediate shaft, meshing with aforesaid gear-wheels, slidable coupling 10, loose bevel-gears on the intermediate shaft, and meshing with aforesaid bevel-gear of the motor-shaft, a shifting lever connected with said coupling, couplings 22 and 23, for the gear-wheels on the intermediate shaft, a rocking lever provided with suitable slots in both ends, said rocking lever having a nose for engaging said shifting lever, coupling-levers connected with couplings 22 and 23 and provided with projections engaging in said slots, and means for rocking said rocking lever, substantially as set forth.

In testimony that I claim the foregoing as my invention I have signed my name in presence of two subscribing witnesses.

FRITZ HENRIOD-SCHWEIZER.

Witnesses:
E. IMER-SCHNEIDER,
L. H. MUNIER.